(12) United States Patent
Ritter et al.

(10) Patent No.: US 8,099,748 B2
(45) Date of Patent: *Jan. 17, 2012

(54) SYSTEM AND METHOD FOR DISTRIBUTION OF PICTURE OBJECTS

(75) Inventors: Rudolf Ritter, Zollikofen (CH); Eric Lauper, Bern (CH)

(73) Assignee: Swisscom (CH)

( * ) Notice: Subject to any disclaimer, the term of this patent is extended or adjusted under 35 U.S.C. 154(b) by 17 days.

This patent is subject to a terminal disclaimer.

(21) Appl. No.: 12/416,469

(22) Filed: Apr. 1, 2009

(65) Prior Publication Data

US 2009/0187933 A1    Jul. 23, 2009

Related U.S. Application Data

(63) Continuation of application No. 10/049,908, filed as application No. PCT/CH00/00053 on Feb. 1, 2000, now Pat. No. 7,565,671.

(51) Int. Cl.
*H04N 7/16* (2006.01)
*H04H 60/33* (2008.01)
*A61B 3/14* (2006.01)

(52) U.S. Cl. ............................. 725/10; 725/46; 351/209

(58) Field of Classification Search .................. None
See application file for complete search history.

(56) References Cited

U.S. PATENT DOCUMENTS

| | | | |
|---|---|---|---|
| 4,931,865 A | 6/1990 | Scarampi | |
| 5,467,104 A | 11/1995 | Kollin et al. | |
| 5,758,257 A | 5/1998 | Herz et al. | |
| 5,758,259 A | 5/1998 | Lawler | |
| 5,818,954 A * | 10/1998 | Tomono et al. | 382/115 |
| 5,886,683 A | 3/1999 | Tognazzini et al. | |
| 5,893,091 A | 4/1999 | Hunt et al. | |
| 5,978,919 A | 11/1999 | Doi et al. | |

(Continued)

FOREIGN PATENT DOCUMENTS

EP    0 643 541 A2    3/1995

(Continued)

OTHER PUBLICATIONS

Paul P. Maglio et al., "Suitor: An Attentive Information System," printed 2005, 8 pages.

(Continued)

*Primary Examiner* — Joseph P Hirl
*Assistant Examiner* — Fred Peng
(74) *Attorney, Agent, or Firm* — McAndrews, Held & Malloy, Ltd.

(57) ABSTRACT

A system and a suitable method for distribution of picture objects which are stored with assigned picture object information in a picture object database. In a media center of the system, user identification data are received which are transmitted to the media center by communications terminals via a communications network. In the media center user interests profiles are defined which, assigned to the received user identification data, are stored in a user interests database. On the basis of the correlation of particular user interests profiles with picture object information, picture objects are selected and transmitted via the communications network to the respective communications terminal from which the received user identification data were transmitted. The current direction of view of a user of the communications terminal is determined and transmitted to the media center, where picture objects which are viewed by the user are identified based thereon. From picture object information assigned to the picture objects viewed by the user, user interests profiles are determined and stored in the user interests database.

18 Claims, 1 Drawing Sheet

U.S. PATENT DOCUMENTS

| | | | |
|---|---|---|---|
| 6,009,410 A | 12/1999 | Lemole et al. | |
| 6,011,537 A | 1/2000 | Slotznick | |
| 6,243,076 B1 * | 6/2001 | Hatfield | 345/156 |
| 6,553,281 B1 * | 4/2003 | Liu | 700/302 |
| 6,792,135 B1 * | 9/2004 | Toyama | 382/118 |
| 7,181,050 B1 * | 2/2007 | Daly et al. | 382/118 |
| 2001/0043594 A1 | 11/2001 | Ogawa et al. | |
| 2003/0149988 A1 | 8/2003 | Ellis et al. | |
| 2006/0282387 A1 * | 12/2006 | Ahmad et al. | 705/50 |

FOREIGN PATENT DOCUMENTS

| | | |
|---|---|---|
| EP | 0 737 930 A1 | 10/1996 |
| EP | 0 816 984 | 1/1998 |
| EP | 0 860 763 A1 | 8/1998 |
| EP | 0 961 490 A2 | 12/1999 |
| JP | 7-59000 | 3/1995 |
| JP | 8-502372 | 3/1996 |
| JP | 8-87870 | 4/1996 |
| JP | 9-51522 | 2/1997 |
| JP | 9-114846 | 5/1997 |
| JP | 9-167124 | 6/1997 |
| JP | 9-245107 | 9/1997 |
| JP | 9-321894 | 12/1997 |
| JP | 10-27165 | 1/1998 |
| JP | 10-91265 | 4/1998 |
| JP | 10-304335 | 11/1998 |
| JP | 10-320413 | 12/1998 |
| JP | 11-41170 | 2/1999 |
| JP | 11-65434 | 3/1999 |
| JP | 11-85762 | 3/1999 |
| JP | 11-203006 | 7/1999 |
| JP | 11-265398 | 9/1999 |
| JP | 2000-13779 | 1/2000 |
| WO | WO 94/09472 A1 | 4/1994 |
| WO | 96 35288 | 11/1996 |
| WO | 97 10558 | 3/1997 |
| WO | 97 41854 | 11/1997 |
| WO | WO 97/41654 A1 | 11/1997 |
| WO | 98 11750 | 3/1998 |
| WO | WO 98/37696 A1 | 8/1998 |
| WO | WO 99/57707 A1 | 11/1999 |
| WO | WO 99/66746 A2 | 12/1999 |

OTHER PUBLICATIONS

"Universal Mobile Telecommunications System (UMTS); Service aspects; Stage 1, Multimedia Messaging Service", ETSI TS 122 140 V3.0.0 Release 1999, Jan. 2000, 1 front page, pp. 1-14.

* cited by examiner

SYSTEM AND METHOD FOR DISTRIBUTION OF PICTURE OBJECTS

CROSS REFERENCE TO RELATED APPLICATIONS

This application is a continuation of U.S. application Ser. No. 10/049,908 filed on Feb. 20, 2002, which is the National Stage of PCT Application No. PCT/CH00/00053 filed on Feb. 1, 2000, the entire contents of each of which are incorporated herein.

BACKGROUND OF THE INVENTION

1. Field of the Invention

This invention relates to a system and a method for distribution of picture objects. In particular, this invention relates to a system and a method for distribution of picture objects which are stored in a picture object database connected to a media center, picture object information being assigned in each case to the picture objects in the picture object database, the picture objects being transmitted from the media center over a communications network to one or more communications terminals connectible to this communications network, and the picture objects being made visible in each case to a user of the communications terminal by means of a display unit of the communications terminal.

2. Description of the Related Art

Methods and systems are known in which centrally stored picture objects provided with assigned object information are transmitted over a communications network to communications terminals and are made visible in each case to users of these communications terminals by means of a display unit of the communications terminal. In the following text, designated as picture objects will be data files comprising a picture content that is preferably established according to a suitable media and/or picture data standard and which is able to be made visible on a display unit to a user through suitable means, for example functions carried out through software or hardware, in particular decompression/compression and reproduction functions. The picture content of these picture objects concerns, for example, still pictures, e.g. digitalized photos, graphics and/or text. It can also concern, however, moving pictures, for instance video sequences. For example, such picture objects are transmitted by web servers over the Internet to communications terminals, such as, for instance, personal computers, and are made visible there to the respective user through a display device, e.g. a screen. In such known systems and methods, picture objects are at most transmitted to the communications terminal of the user in a way dependent upon how the user navigates through different pages available at the web server, i.e. which navigation commands and/or search commands and search parameters the user enters, without individual picture objects being selected by the web server in a user-specific way and being transmitted to the user.

SUMMARY OF THE INVENTION

It is an object of this invention to propose a new and better system and a new and better method for distributing picture objects which make it possible for picture objects to be selected in a user-specific way and transmitted to the communications terminal of a respective user without the respective user having to enter commands and/or data for this user-specific selection.

These aims are achieved according to the invention in particular through the elements of the independent claims. Further, preferred embodiments follow moreover from the dependent claims and from the description.

This object is achieved through the present invention in particular in that, in a system for distributing picture objects comprising
  a communications network,
  at least one media center connected to this communications network,
  a picture object database connected to the media center in which picture object database the picture objects and picture object information assigned to these picture objects are stored, and
  one or more communications terminals connectible to this communications network each having a display unit by means of which display unit the picture objects are made visible to a user of the communications terminal,
  user identification data are received by the media center which are transmitted in each case from one of the communications terminals over the communications network to the media center,
  the user interests profile assigned to the received user identification data is determined by the media center from a user interests database, connected to the media center, in which database are stored user interests profiles and user identification data assigned to these user interests profiles,
  selected by the media center from the picture object database are picture objects to which picture object information is assigned having at least one point of correspondence, i.e. at least one correlation based on a predefined correlation value, with information from the selected user interests profile, and
  at least one of the selected picture objects is transmitted by the media center over the communications network to the respective communications terminal from which the received user identification data was transmitted. The receipt of user identification data from a communications terminal of a user, the determining of a user interests profile assigned to these user identification data, and the selection and transmission of picture objects on the basis of the determined user interests profile and on the basis of the picture object information assigned to the picture objects by the media center has the advantage that picture objects can be selected by the media center in a user-specific way and transmitted to the communications terminal of the user without this user having to enter commands and/or data.

The current direction of view of at least one eye of a user is preferably determined in each case by a direction-of-view-determining module of the communications terminal of the respective user, the determined current direction of view in each case is transmitted from this communications terminal via the communications network to the media center, and picture objects which are viewed by the user of this communications terminal are determined by a direction-of-view-evaluation module of the media center on the basis of the determined current direction of view and on the basis of video objects and/or picture objects which have been transmitted from the media center over the communications network to this communications terminal. The capturing of picture objects that are viewed by the user has the advantage that it can be statistically evaluated which picture objects are viewed as a whole or in particular by specific users. If, for example, the picture objects relate to advertising for services and/or products that are offered by a respective provider, the distribution efficiency of this kind of advertising can be evaluated without data having to be given by the user.

User interests profiles are preferably determined by an interests-determining module of the media center on the basis of the selected picture objects and are stored in the user interests database. The advantage of determining user interests profiles on the basis of selected picture objects that are viewed by individual users is that these user interests profiles can be determined in the media center dynamically and automatically without commands and/or data having to be entered by the users for this purpose.

In an embodiment variant, the picture object information includes order numbers, the user identification data include an unambiguous user identification, and an order is initiated by an order module of the media center for one of the selected picture objects, the order number assigned to this picture object and the unambiguous user identification being used for the order. The advantage of providing picture objects with order numbers and of initiating an order on the basis of a particular picture object being viewed by the user is that no data relating to the object desired have to be given, which object corresponds to the picture content of the picture object being viewed by the respective user, and no data concerning the desired object have to requested from the user by the media center.

In an embodiment variant, the selected picture objects are inserted into video objects by the media center, which video objects are transmitted from the media center over the communications network to the respective communications terminal, where they are made visible to the user of the respective communications terminal by means of the display unit. The insertion of picture objects into video objects which are transmitted to the communications terminal of a respective user and are made visible there to this user by means of a display unit is that picture objects can be made visible to the user during the viewing of video objects, these picture objects being able to be selected according to the interests profile of the respective user, as mentioned above. It should be mentioned here as a concrete application, for example, that films (video objects) can be played for the user free of charge into which picture objects are inserted from time to time whose picture content relates to advertising for products and/or services that are offered by a provider and that correspond to the respective user interests profile.

In an embodiment variant, the video objects are generated by a video synthesizer from stored media objects, the media objects, to which media object information is assigned, e.g. by the video synthesizer, being selected such that the media object information has at least one point of correspondence, i.e. at least one correlation based on a predefined correlation value, with the information from the determined user interests profile. The advantage of generating the video objects from media objects that are selected in particular according to the interests profile of the respective user is that the video objects can be generated dynamically and user-specifically by the video synthesizer. A further advantage is that picture objects can be inserted into the video objects in such a way that they are perceived by the user as a component of the video sequences corresponding to the video objects, i.e. the picture objects are perceived as an integral part of the viewed video sequences.

In an embodiment variant, biometric features are captured in the communications terminals by means of sensors, which biometric features are inserted into the user identification data. The advantage of this embodiment variant is that, on the one hand, biometric features, for example fingerprints, eye patterns, facial features and/or voice patterns, have a high level of security, and a user does not have to remember special codes or carry around with him separate means of identification, and, on the other hand, the capturing of these biometric data through corresponding sensors at the communications terminal makes unnecessary the entry of data relating thereto by the user. To establish the identity of a user, the biometric features can be assigned further user data in a database, for example name, address and bank connection. The biometric features can also be used for mere (anonymous) re-identification of a respective user, however, the biometric features not being assigned any further data for identification of the user.

In an embodiment variant, retinal patterns are captured by means of microelectromechanical scanners, which retinal patterns are inserted into the user identification data. The advantage of the retinal patterns is that they make possible an unambiguous user (re-) identification that meets high security requirements, in particular because retinal patterns are not very variable biometric features that change only insignificantly in the course of time. The use of microelectromechanical scanners for capturing the retinal patterns has the advantage that the microelectromechanical scanners have very small dimensions and can also be a component of a virtual retinal display device, for instance. In an embodiment variant, lights signals corresponding to the video objects and/or the picture objects are projected directly on the retina of the user by means of such a virtual retinal display unit.

In an embodiment variant, the communications network comprises a mobile radio network, for instance a GSM network (Global System for Mobile Communications), a UMTS network (Universal Mobile Telephone System) and/or another, e.g. satellite-based, mobile radio network, and the communications terminals comprise mobile radio devices, for instance mobile radio telephones and/or portable communication-capable computers. The advantage of using mobile radio networks as the communications networks and mobile radio devices as the communications terminals in the system according to the invention is that the users can be mobile and can move about freely.

In an embodiment variant, picture objects and assigned picture object information relating in each case to products and/or services and entered by providers of such products and/or services over a communications network, for example a mobile radio network or a fixed network, in particular the Internet or the public switched telephone network or an ISDN network, are received and stored in a picture object database. The advantage of this embodiment variant is that direct access to an advertising platform is thereby given to providers of products and/or services, via which access the providers can enter on their own initiative and self-sufficiently picture objects and picture object information belonging thereto into the system according to the invention for automatic and user-specific distribution of picture objects.

One embodiment of the present invention will be described in the following with reference to an example. The example of the embodiment is illustrated by the single attached FIGURE:

DETAILED DESCRIPTION OF THE PREFERRED EMBODIMENTS

Figure 1:
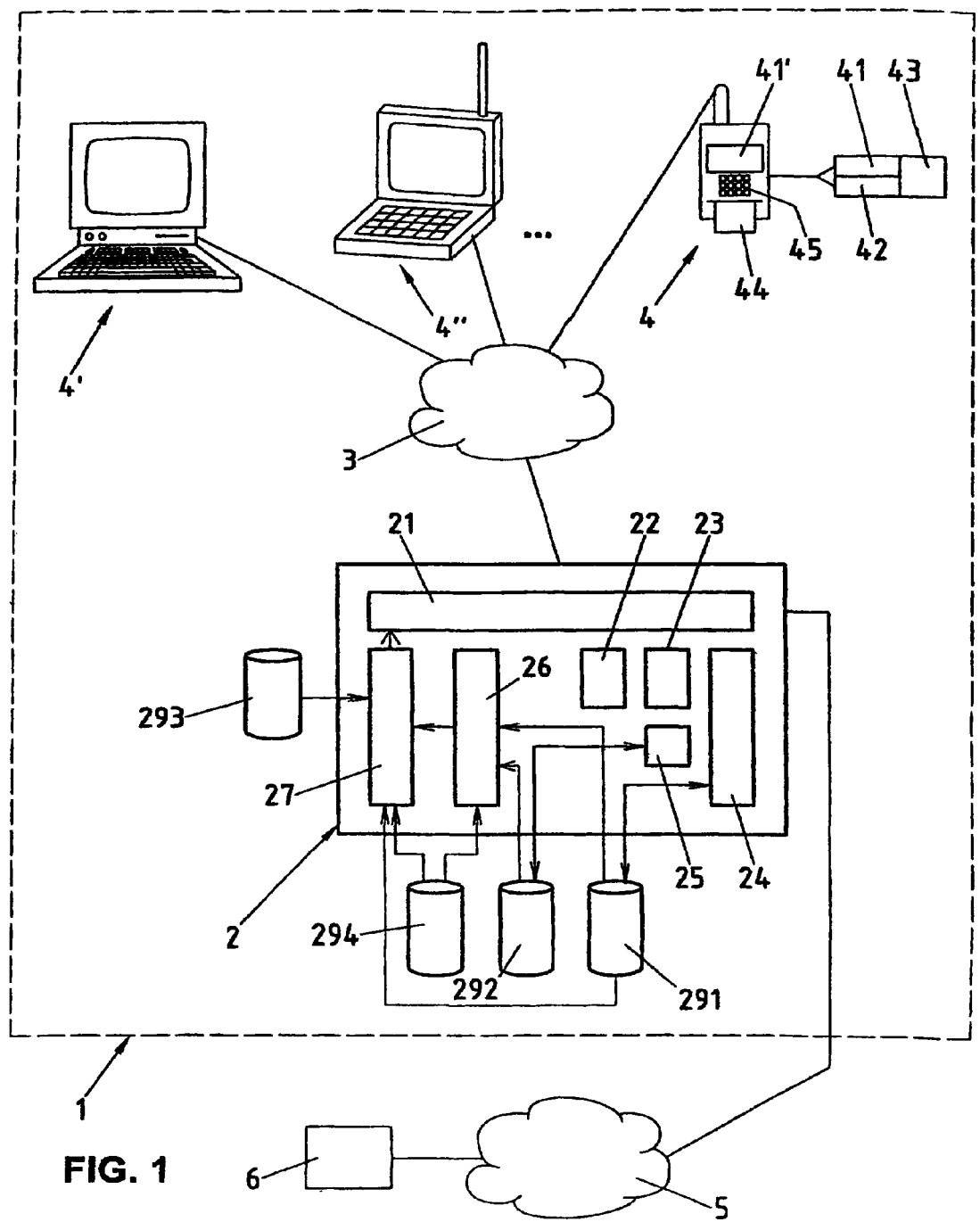
FIG. 1 shows a block diagram of the system for distribution of picture objects, which block diagram represents schematically a media center that is connected via a communications network to communications terminals, each having a display unit and a direction-of-view-determining module.

In FIG. 1, the reference numeral 1 refers to the system for distribution of picture objects. A description of the picture objects has already been given in the introduction; mentioned here in particular should be picture objects according to the MPEG-4 standard, an ISO/IEC standard (ISO/IEC 14496) developed by MPEG (Moving Picture Expert Group) and relating to which an overview was available at the time of the application, for instance on the Internet page www.cselt.stet.it/mpeg/standards/mpeg-4. MPEG-4 offers a standard for a) representing objects with audible, visible or audiovisual content, so-called media objects, whose content can be of natural origin (recorded through microphone and/or camera) or synthetic origin (generated by computer); b) describing the combination of such media objects into composite media objects forming audiovisual scenes; c) multiplexing or synchronization of data of such media objects for transmission over communications networks; and d) the interaction with audiovisual scenes which are generated at the recipient. According to MPEG-4, audiovisual scenes composed of a plurality of hierarchically organized media objects, for instance of still picture objects, e.g. a still background, of moving picture objects, which are also referred to here as video objects, e.g. a singing musician, and of audio objects, e.g. the song of the musician. MPEG-4 defines the coded representation of media objects with content of natural or synthetic origin, which can be executed in two-dimensional or three-dimensional form. To achieve the present invention, the MPEG-4 standard, or a further development of the MPEG-4 standard or a similar standard is preferably used as the standard for still picture objects, for moving picture objects (or video objects), and for audio objects, the still picture objects and the moving picture objects (video objects) being simple or composite media objects according to this preferred standard, and these media objects also being able to comprise audio objects, as mentioned above. For end-to-end transmission of the media objects over communications networks 3, 5, the Delivery Multimedia Integration Framework (DMIF) protocol defined in MPEG-4 can be used. For the description of scenes that are made up of individual media objects, the Binary Format for Scenes (BIFS) defined in MPEG-4 can be used which is based on the Virtual Reality Modeling Language (VRML). The scene description is coded and transmitted together with the individual media objects.

A communications network 3 is shown schematically in FIG. 1 as part of the system 1 for distribution of picture objects, via which communication-capable communications terminals 4, 4', 4" are able to communicate with a media center 2, i.e. in particular exchange data. The communications network 3 can comprise a plurality of communications networks of different kinds, for instance fixed networks, e.g. the public switched telephone network, an ISDN network (Integrated Services Digital Network), a PLC network (Power Line Communication) or an IP network (Internet Protocol), in particular the worldwide Internet, and/or mobile radio networks, for instance GSM or UMTS networks or another, e.g. satellite-based, mobile radio network. Accordingly the communications terminals 4, 4', 4" connectible to the communications network 3 can comprise communications terminals of different kinds, for example fixed-installed communications terminals 4', for instance a personal computer or terminal accessible to the public, or portable communication-capable computers 4", e.g. laptop computers, palmtop computers or mobile data assistants (PDA, Personal Data Assistant) with suitable communications modules, or mobile radio devices, in particular mobile radio telephones 4. For the transport of data, in particular data of the picture and video objects, between the media center 2 and the mobile radio telephone 4', GPRS services (Generalized Packet Radio Services) or HSCSD services (High Speed Circuit Switched Data) can be used, for example, or other suitable services. The communications network 3 can also comprise a unidirectional broadcast system, for instance a DAB (Digital Audio Broadcasting) or DVB system (Digital Video Broadcasting), via which media objects are transmitted from the media center 2 to the communications terminals 4, 4', 4", which are equipped with DAB or DVB receivers for this purpose, and which comprise for the return channel to the media center 2 a suitable communications module for communication over a fixed or mobile radio network of the communications network 3. It should be indicated by way of the three points in FIG. 1 that a multiplicity of communications terminals 4, 4', 4" are connectible to the media center 2 via the communications network 3. Although, in FIG. 1, certain components of the communications terminals have been shown only for the mobile radio telephone, all these components can also be available with the other communications terminals 4' and 4". Mentioned here as examples of such certain components should be the display unit 41, the direction-of-view-determining module 42 and the retina scanner 43, which are connected to the mobile radio telephone 4 via a device interface having contacts or without contacts, for instance.

The display unit 41 is, for example, a virtual retinal display unit 41, which makes picture objects visible to the user in that it projects light signals corresponding to the picture objects directly on the retina of the eye of the user. For this projecting and capturing of light reflected or emitted by objects, the display device 41 comprises at least one microelectromechanical (MEMS, MicroElectroMechanical System) element, in particular a microelectro-mechanical scanner. The user of microelectromechanical scanners comprising a microelectromechanical element with a biaxial mirror for projecting picture objects into a direct retinal display unit and/or for receiving light reflected or emitted by objects is described, for example, in the patent application WO 98/13720. A virtual retinal display unit (Virtual Retinal Display, VRD) which is able to project light signals corresponding to picture objects directly onto the retina of a viewer has been described, for example, in the patent applications WO 94/09472, WO 97/37339 and in the above-mentioned patent application WO 98/13720. These virtual retinal display units can be supplied via a video interface with data on picture objects, for instance in the form of a RGB signal, a NTSC signal, a VGA signal or another formatted color or monochrome video or graphic signal. One skilled in the art will understand that it can be advantageous to adapt the virtual retinal display device described in the mentioned patent publications WO 94/09472 and WO 97/37339, or respectively the video interface described there, such that it is able to receive and process different data formats efficiently, depending upon the picture objects used. By means of an interface module (not shown), which is installed in the communications terminal 4, for instance, data on picture objects can also be suitably adapted to the video interface, or respectively received data on picture objects can be converted in such a way as to be able to be applied to the video interface and made visible to the user by means of the virtual retinal display unit 41.

The components of the display device 41 are preferably integrated in a common housing or are installed on a common support, this housing or this support being preferably designed such that it can be put on by a user like conventional eyeglasses or like a helmet. Further components, such as, for example, a microphone, headphones, the mentioned device interface, the direction-of-view-determining module 42 and/or the retina scanner 43 can likewise be installed on/in this common support. Also possible are communications terminals 4, 4, 4" <sic. 4, 4', 4">, which are executed (as a device) together with the display unit 41 as well as together with the last-mentioned further components, if applicable, in a common housing or on a common support.

As shown schematically in FIG. 1, connected to the display unit 41 is the direction-of-view-determining module 42, which determines the current direction of view of the eyes of the user through determination of the current eye positions of the user during viewing of picture objects, and is able to transmit it via the above-mentioned device interface to the mobile radio telephone 4. A direction-of-view determining module (eye tracker) which determines current eye positions based on the position of the pupil of a user has likewise been described in the above-mentioned patent application WO 94/09472, and can be extended by one skilled in the art such that the determined eye positions can be transmitted via the device interface to the mobile radio telephone 4; depending upon the embodiment, values for both eyes can be made available. It should be mentioned here moreover that, in order to determine the actual direction of view of the user, which is not limited to the direction of view with respect to the display unit 41, determined eye positions can additionally be combined, for example in the mobile radio telephone 4, with captured head position, or head movement, captured as horizontal and vertical head angles with respect to the horizontal and vertical plane by an additional body-part-position-determining module (not shown).

By means of the above-mentioned microelectromechanical scanner, respectively by means of an additional such microelectromechanical scanner, which can be used for capturing light reflected or emitted by objects in addition to projecting light signals on the retina, the retinal pattern of a user can also be captured, in particular the pattern formed by the veins of the retina. For this purpose, the microelectromechanical scanner delivers the light reflected by the retina, for example by means of a beam splitter, to (at least) one light-sensitive element. Such a retina scanner, which can also be designed for polychrome images and is suitable for capturing such retinal patterns, has been described, for instance, in the above-mentioned patent application WO 98/13720. The light values captured in the light-sensitive element(s) are digitalized in the retina scanner 43, for example, and from the reflection data obtained therefrom, the retinal pattern is generated, for example by means of a subtraction operation from projected and reflected light. The capturing of retinal patterns by the retina scanner 43, which comprises the above-described components for capturing the retinal pattern, can be initiated by means of a corresponding command, for example, which is sent from the mobile radio telephone 4 to the retinal scanner 43 via the device interface. It is also possible for the retina scanner 43 to be provided with a separate light source for determining the retinal pattern, for instance an LED (Light Emitting Diode) or a laser, whose light rays are projected on the retina as a grid of picture points or light points, for instance by means of a suitable microelectromechanical movable mirror, so that the captured reflection data, which, as mentioned above, are obtained from the reflected light rays, correspond to the retinal pattern. This direct capturing of the retinal pattern can take place during simultaneous viewing of picture objects by the user if the separate light source emits light containing wavelengths other than the light signals corresponding to the picture objects, for instance if the light source is an infrared light source, and if the light-sensitive element used is correspondingly designed for this light.

It should be mentioned here that although, in this preferred embodiment example, only the capturing of retinal patterns as eye features has been gone into, other eye patterns can also be captured, for instance patterns of the iris.

One skilled in the art will understand that, in the sense of the present invention, components used by the virtual retinal display unit 41, the direction-of-view-determining module 42 and the retina scanner 43, such as pivotable microelectromechanical mirrors, light sources, light-sensitive elements and/or programmable processors, can be combined in different embodiment variants of the display unit 41, of the direction-of-view-determining module 42 and of the retina scanner 43, or separate components can be used in each case for the display unit 41, the direction-of-view-determining module 42 and the retina scanner 43. It is also possible for individual components to be able to be replaced by components with combined function, for instance an LED light source and a light-sensitive element.

The media center 3 consists of one or more computers connected to one another, in particular high-capacity servers, which have a communications module 21 which is equipped with the necessary hardware and software components for communication via the communications network 3 with the communications terminals 4, 4', 4", and via the communications network 5, which can be designed like the communications network 3, with communications terminals 6 of providers, who offer for sale products and/or services, for instance. As is shown schematically in FIG. 1, the media center 2 is connected to various databases 291-294. These databases 291-294 can be executed on separate computers connected to the media center 2 and/or can be executed jointly of the same computer(s) as the media center 2. The databases 291-294 can also be executed in a joint database. For storing their data, the databases 291-294 comprise suitable data carriers which can be designed differently depending upon the volume and necessary access time of the data stored thereon. The media center 2 comprises further functional modules 22-27, which are achieved either as programmed software modules stored in a memory of the media center 2 and executable on a processor of the media center 2, or are achieved as a combination of such software modules with suitable hardware components, or are achieved purely as hardware components.

It should be made clear here that the arrows shown in FIG. 1 connecting the functional modules 24-27 and the databases 291-294 are provided for better understanding of the data flow, described later, between these modules and components, but that these arrows do not illustrate in any limiting way the technical achievement of the communication channels, or respectively interfaces, between these modules and components.

An interested user can contact the media center 2 with his communication-capable communications terminal 4, 4', 4" via the communications network 3, for example through automated or manual selection of a corresponding service number of the media center 2. After successful contact, for instance upon inquiry of the media center 2, the communications terminal 4 transmits user identification data for the respective user via the communications network 3 to the media center 2, where they are received, for example by the communications module 21, and are forwarded to the interests-determining module 25. The user identification data are temporarily stored in the media center 2, for assignment of a respective user to his communications terminal 4, 4', 4" the user identification data being assigned an identification relating to the communications terminal 4, 4', 4" from which the user identification data were received, or relating to the communications connection (session) with this communications terminal 4, 4', 4". The user identification data comprise, for example, biometric user features, for instance fingerprints, eye patterns, facial features and/or voice patterns which are stored, for example, on a chipcard 44 removably connected to the communications terminal 4, or which are captured through suitable sensors of the communications terminal 4. The eye pattern is, for example, a retinal pattern which is captured by the above-mentioned retina scanner 43. The user identification data can also comprise further elements, for example an unambiguous user identification that can be used internationally, e.g. an International Mobile Subscriber Identity (IMSI) for identification at a network operator or a user identification, for instance an International Debit User Identification (IDUI) for identification at financial services providers, e.g. banks and/or credit card companies, or which can be used for unambiguous identification of the user by a provider or a group of providers, e.g. a membership number.

By means of IVR (Interactive Voice Response) or speech recognition services or through transmission of menu structures shown in each case on a display unit of the respective communications terminal, for instance in the form of a software program, e.g. a Java applet (Java is a registered trademark of the company Sun Microsystems), the media center 2 can make it possible for the user to select from among different available service offers and/or media offers, in particular film offers. Corresponding to the selection made by the user, or otherwise corresponding to a selection made by the media center 2, for instance on the basis of a user interests profile stored in the user interests database 292, which is assigned to the received user identification data, media objects, in particular video objects, are then transmitted from the media center 2, for instance free of charge, over the communications network 3 to the communications terminal 4 of the respective user, where they are made visible to this user by means of the display unit 41. The media objects thereby correspond to films which are stored in the video database 293, or the video objects are generated by a video synthesizer 27 of the media center 2 from media objects which are stored in the media object database 294. The generation of video objects by the video synthesizer 27 makes possible automatic production of synthetic or virtual films, for instance according to object-oriented scripts.

While the viewer is viewing the media objects transmitted by the media center 2, in particular video objects and picture objects, made visible by means of the display unit 41, the current direction of view of at least one eye of the user is continuously determined by the direction-of-view-determining module 42 of the communications terminal 4, for instance periodically according to a predefined time period, or in each case upon inquiry by the media center 2, and is transmitted over the communications network 3 to the media center 2, for instance together with a time indication or an indication for identification of the currently shown media object 2. Determined by a direction-of-view-evaluation module 23 of the media center 2 on the basis of the current direction of view, received in the media center 2, of a viewer, is the media object, or respectively video object or picture object, lying in the current direction of view of the video and/or picture objects viewed by the user, which have been transmitted by the media center 2 to the communications terminal 4, 4', 4" of the user. This media object, or video object or picture object, is thereby determined in that, from the current direction of view with respect to the display unit 41, the coordinates are determined of the viewed spot of the media object (picture or video object) being made visible to the user at this point in time, and, on the basis of these coordinates, the media object, or video object or picture object is determined which is located at this spot. An object reference to the thus determined media object, or video object or picture object, is made available by the direction-of-view-evaluation module 23 to other modules of the media center 2, for instance the interests-determining module 25, for further use.

The object references to the determined media objects, or video or picture objects are stored assigned to the user identification data for the respective user by the interests-determining module 25 of the media center 2, and, for instance on the basis of the frequency and/or duration with which these media objects or video or picture objects are viewed by the respective user, a user interests profile is created, or updated, which is stored, assigned to the user identification data for the respective user, in the user interests database 292. In creating the user interests profile, media object information, in particular video and/or picture object information, is taken into consideration by the interests-determining module 25, which information is stored in each case, assigned to the respective media object or video or picture object, in the media object database 294, or respectively picture object database 291. For composite media objects that are stored in the video database 293, media objects, or video or picture objects of which the media objects in the video database 293 are composed, as well as associated media object information, or video or picture object information are stored in the media object database 294 and/or in the picture object database 291. In particular for media objects or video or picture objects relating to products and/or services, media object information or video or picture object information, comprises, for example, data concerning these products and/or services, for instance types, names, structured classifications, costs, technical features and/or outer appearance (design, color), and/or data relating to the provider(s) and/or manufacturers of such products and/or services, for instance branch, name, address, number of employees, financial conditions and/or founding year of the firm. Correspondingly, the user interests profile comprises, for example, data relating to products and/or services in which the respective user is interested, for instance type, name, structured classifications, costs, technical features and/or outer appearance (design, color), and/or data relating to provider and/or manufacturer of such products and/or services in which the respective user is interested, e.g. branches, names, addresses, number of coworkers, financial conditions and/or founding year. Data about the service and/or media offers, in particular film offers, in which the respective user is interested can also be contained in the user interests profile. It is also possible for user interests profiles to be defined by the user himself on-line, for example over the communications network 3, or respectively off-line, and updated directly, or at a later point in time, in the user interests database 292.

On the basis of the user identification data received from a respective user, the user interests profile assigned to these user identification data in the user interests database 492 <sic. 292> is determined in the media center 2 by a media object determining module 26. On the basis of the determined user interests profile, the media object determining module 26 determines the media objects, which are stored in the media object database 294, or picture objects, which are stored in the picture object database 291 in which the respective user could be interested. For this purpose, the correlation between the user interests profile and the media object information, or the picture object information, is determined by the media object determining module 26, which information is stored in the media object database 294, or respectively the picture object database 291, associated in each case with the media objects or the picture objects. Thereby varied—for instance depending upon how many data are contained in a respective user interests profile—can be the correlation factor, i.e. the degree of agreement between user interests profile and the media object information or picture object information set as a prerequisite for a media object or a picture object to be classified by the media object determining module 26 as interesting for the respective user. A minimal correlation between user interests profile and the media object information or picture object information, is, for instance, the e.g. semantic agreement with at least one data element. Object references to media objects stored in the media object database 294 or to picture objects stored in the picture object database 291, which are classified as interesting for the user, are forwarded by the media object determining module 26 to the video synthesizer 27. The temporal sequence of execution of the forwarding of object references to the video synthesizer 27 is thereby controlled by the media object determining module 26, for example, in particular if numerous media objects, respectively picture objects, are classified as interesting for the user. The media object determining module 26 can also limit the number of object references sent to the video synthesizer 27 to a predefined number, this number being defined, for instance, as number per unit of time, and object references to media objects or picture objects having the highest determined correlation being preferably forwarded in a preferential way.

The video synthesizer takes from the object database 291 in each case the picture object corresponding to an object reference, and inserts it into the video objects that are transmitted from the video database 293 to the communications terminal 4 of the respective user from whom the respective user identification data were received. The coordinates, at which the picture object is inserted into the video object can be predefined, for example, or can be determined with a random algorithm. Besides the integration of picture objects into the picture region of the video object perceived by the user, picture objects can also be inserted into the video objects such that they interrupt the video sequence from the perspective of the user in that they fill the entire picture region. In addition to insertion of picture objects into video objects, the video synthesizer can also generate video scenes, respectively films, synthetically in that media objects are taken from the media object database 294, in particular media objects for which the object references have been received from the media object determining module 26, and are put together, for instance according to a predefined script, as new composite media objects or video objects which are transmitted to the communications terminal 4 of a respective user. Picture objects, for which object references have been received from the media object determining module 26, can likewise be inserted by the video synthesizer into such synthetically generated media objects, respectively video objects. It should be mentioned here once again that the picture objects from the picture object database 291, which are inserted into the media objects or video objects, are not limited to still pictures only, but that they can also contain moving pictures, even audio objects. For statistical evaluations, forwarded object references can be stored in the media center 2 and numerically recorded.

In an embodiment variant, the picture object information for the picture objects also includes an order number comprising an identification of a product and/or service as well as an identification of a provider of this product and/or of this service, for example. Such picture objects can be marked for the user with a visible graphic identification, for instance. If a user is viewing such a picture object and at the same time transmits a predefined order command to the media center 2, for instance by means of spoken language or with operating elements 45 of the communications terminal 4 or by immediately afterwards looking at a control icon made visible to the user by the display unit 41, an order is initiated by the order module 22 in the media center 2. An order is thereby generated comprising the order number as well as data for unambiguous identification of the respective user, following corresponding confirmation by the respective user, if applicable, and is sent to the respective provider, for instance by e-mail, by fax or by means of conventional mail. Although user identification data with biometric features make it possible to identify a user again unambiguously, further user-specific data, such as, for example, name and address, in particular delivery address, should be associated with these user identification data for completion of an order. If such data are not available in the media center 2, it is advantageous if the user identification data contain an alternative or additional unambiguous user identification, for example an IMSI (International Mobile Subscriber Identity), which can be used by the operator of the communications network 3 to identify the respective user and to complete the order with further data on the user, for instance from a subscriber database, before the data are forwarded to the respective provider.

To enable providers of products and/or services to have picture objects distributed relating to their products and/or services over the described system for user-specific distribution of picture objects, the media center 2 has a picture object input module 24 which these providers can access over the communications network 5 by means of suitable communications terminals 6 and by means of suitable access software, for example browsers. Besides predefined input forms for entry of picture object information, the picture object input module 22 can also make available to providers conversion and editing tools, for example, to facilitate the entry of picture objects, for instance, having a different format from that used by the media center 2. Picture objects and associated picture object information input via the picture object input module 22 are stored in the picture object database 291 by the picture object input module 22. A monetary amount depending upon the number and/or the data volume of the stored picture objects and associated picture object information can be billed to the providers, for example. This monetary amount can also be calculated depending upon the storage duration (which can be limited, for example) of these picture objects in the picture object database 291 and/or upon the number of transmissions of the picture objects to communications terminals 4, 4', 4" of interested users.

The system and method according to the invention for distribution of picture objects makes possible a user-specific distribution of picture objects according to user interests profiles. Through the system and the method for user-specific distribution of picture objects, moreover, these user interests profiles can also be determined automatically without respective users having thereby to enter data. The described system and method can also capture user identification data for respective users automatically without the user having to enter data for this purpose, and assign determined user interests profiles to these user identification data. Through the storage and assignment of determined user interests profiles and user identification data, the user interests profiles can be re-assigned to a respective user at later points in time, which can take place anonymously, for example, i.e. without knowledge of the identity of the respective user, if no further personal data are assigned to the user identification data that would make it possible to establish the identity of the respective user. The system and method according to the invention for distribution of picture objects offers in particular providers of products and/or services a platform for automatic and user-specific distribution of advertising relating to their products and/or services, the providers also being in particular informed through statistical information about how frequently and/or how long their picture objects are viewed by users, for instance compared to picture objects of other providers. If the mentioned anonymity is not desired, further identification data for respective users can be stored assigned to the user identification data, for example with the consent of the respective user given on-line. Statistical information can also be made available to interested providers about the overall state of interests of users of the system for distribution of picture objects.

The invention claimed is:

1. A method for determining a user interest based on picture objects viewed by a user of a communications terminal, the method comprising:
   transmitting by a media center video objects and/or picture objects via a communications network to the communications terminal;
   making visible to the user the video objects and/or picture objects on a display unit of the communications terminal;
   determining a current direction of view of at least one eye of the user with respect to the display unit, by an eye tracker at the communications terminal detecting a position of a pupil using light reflected off of the pupil, which is detected by the eye tracker;
   transmitting the determined current direction of view by the communications terminal over the communications network to the media center;
   determining, by the media center, viewed spots of the video objects and/or picture objects based on the determined current direction of view;
   determining, by the media center, viewed picture objects located at the viewed spots and viewed by the user; and
   determining by the media center the user interest based on the viewed picture objects,
   wherein the determining of viewed spots is performed using
      a beam splitter, through which light is passed to the pupil and which is configured to receive light reflected off of the pupil;
      a lens which is configured to receive light from the beam splitter which is reflected off of the pupil; and
      a position sensing diode which receives light from the lens which has been reflected off of the pupil, and which has been reflected off of the beam splitter, the position sensing diode outputting a signal to the eye tracker.

2. The method of claim 1, wherein the communications terminal transmits user identification data via the communications network to the media center;
   order numbers identifying a product and/or service are assigned to at least some of the picture objects; and
   the media center generates for the user an order for the product and/or service based on the user identification data and the order number assigned to a respective one of the viewed picture objects.

3. The method of claim 2, wherein the order numbers include an identification of a provider; and
   the media center transmits the order to the provider identified in the respective order number.

4. The method of claim 1, wherein the communications terminal transmits user identification data via the communications network to the media center; and
   the media center stores the user interest in a user interest profile assigned to the user identification data.

5. The method of claim 4, wherein the media center determines at least one selected picture object associated with picture object information having at least one correlation with information from the user interest profile; and
   the media center transmits the selected picture object via the communications network to the communications terminal.

6. The method of claim 5, wherein the media center inserts the selected picture object in a video object transmitted via the communications network to the communications terminal.

7. The method of claim 4, wherein the media center determines selected media objects associated with media object information having at least one correlation with information from the user interest profile;
   the media center generates a synthesized video object from the selected media objects; and
   the media center transmits the synthesized video object via the communications network to the communications terminal.

8. The method according to claim 1, wherein the communications network comprises a mobile radio network and the communications terminals comprise mobile radio devices.

9. A method for determining a user interest based on picture objects viewed by a user of a communications terminal, the method comprising:
   transmitting by a media center video objects and/or picture objects via a communications network to the communications terminal;
   making visible to the user the video objects and/or picture objects on a display unit of the communications terminal.
   determining a current direction of view of at least one eye of the user with respect to the display unit, by an eye tracker at the communications terminal detecting a position of a pupil using light reflected off of the pupil, which is detected by the eye tracker;
   transmitting the determined current direction of view by the communications terminal over the communications network to the media center;
   determining, by the media center, viewed spots of the video objects and/or picture objects based on the determined current direction of view;
   determining, by the media center, viewed picture objects located at the viewed spots and viewed by the user; and
   determining by the media center the user interest based on the viewed picture objects, wherein the determining of viewed spots is performed using
      a light source which imparts light onto the pupil;
      a combiner which reflects light which has been reflected off of the pupil;
      a lens; and
      a CCD which receives the light reflected off of the combiner and which has passed through the lens,
   wherein the eye tracker includes a pupil position processor which receives a signal from the CCD and determines the position of the pupil.

10. A system for determining a user interest based on picture objects viewed by a user of a communications terminal, the system comprising:
   a media center configured to transmit video objects and/or picture objects via a communications network to the communications terminal,
   the communications terminal comprising
      a display unit for making visible to the user the video objects and/or picture objects; and
      a direction-of-view-determining module configured to determine a current direction of view of at least one eye of the user with respect to the display unit, by detecting a position of a pupil using light reflected off of the pupil which is detected by an eye tracker,
wherein the direction-of-view-determination module includes
a beam splitter, through which light is passed to the pupil and which is configured to receive light reflected off of the pupil;
a lens which is configured to receive light from the beam splitter which is reflected off of the pupil; and
a position sensing diode which receives light from the lens which has been reflected off of the pupil, and which has been reflected off of the beam splitter, the position sensing diode outputting a signal to the eye tracker, and the media center comprising
a direction-of-view-evaluation module configured to determine viewed spots of the video objects and/or picture objects based on the current direction of view transmitted by the communications terminal over the communications network to the media center, and to determine viewed picture objects located at the viewed spots and viewed by the user; and
an interest-determining module configured to determine the user interest based on the viewed picture objects.

11. The system of claim 10, wherein the communications terminal is configured to transmit user identification data via the communications network to the media center;
order numbers identifying a product and/or service are assigned to at least some of the picture objects; and
the media center includes an order module configured to generate for the user an order for the product and/or service based on the user identification data received from the communications terminal and the order number assigned to a respective one of the viewed picture objects.

12. The system of claim 11, wherein the order numbers include an identification of a provider; and
the order module is configured to transmit the order to the provider identified in the respective order number.

13. The system of claim 10, wherein the communications terminal is configured to transmit user identification data via the communications network to the media center; and
the interest-determining module is configured to store the user interest in a user interest profile assigned to the user identification data.

14. The system of claim 13, wherein the media center is configured to determine at least one selected picture object associated with picture object information having at least one correlation with information from the user interest profile, and to transmit the selected picture object via the communications network to the communications terminal.

15. The system of claim 14, wherein the media center is configured to insert the selected picture object in a video object transmitted via the communications network to the communications terminal.

16. The system of claim 13, wherein the media center is configured to determine selected media objects associated with media object information having at least one correlation with information from the user interest profile;
the system further comprises a video synthesizer configured to generate a synthesized video object from the selected media objects; and
the media center is configured to transmit the synthesized video object via the communications network to the communications terminal.

17. The system according to claim 10, wherein the communications network comprises a mobile radio network, and the communications terminals comprise mobile radio devices.

18. A system for determining a user interest based on picture objects viewed by a user of a communications terminal, the system comprising:
a media center configured to transmit video objects and/or picture objects via a communications network to the communications terminal,
the communications terminal comprising
a display unit for making visible to the user the video objects and/or picture objects; and
a direction-of-view-determining module configured to determine a current direction of view of at least one eye of the user with respect to the display unit, by detecting a position of a pupil using light reflected off of the pupil which is detected by an eye tracker, and
the media center comprising
a direction-of-view-evaluation module configured to determine viewed spots of the video objects and/or picture objects based on the current direction of view transmitted by the communications terminal over the communications network to the media center, and to determine viewed picture objects located at the viewed spots and viewed by the user; and
an interest-determining module configured to determine the user interest based on the viewed picture objects,
wherein the direction-of-view-determination module includes
a light source which imparts light onto the pupil;
a combiner which reflects light which has been reflected off of the pupil;
a lens; and
a CCD which receives the light reflected off of the combiner and which has passed through the lens,
wherein the eye tracker includes a pupil position processor which receives a signal from the CCD and determines the position of the pupil.

* * * * *